Feb. 23, 1926.

C. D. REYNOLDS 1,574,059

COIL WINDING MACHINE

Filed Jan. 14, 1924   10 Sheets-Sheet 3

Inventor:
Charles D. Reynolds,
By
Watson, Coit, Morse & Grindle,
Attorneys.

Feb. 23, 1926. 1,574,059
C. D. REYNOLDS
COIL WINDING MACHINE
Filed Jan. 14, 1924 10 Sheets-Sheet 4

Inventor:
Charles D. Reynolds,
By
Watson, Coit, Morse & Grindle,
Attorneys.

Feb. 23, 1926.  
C. D. REYNOLDS  
COIL WINDING MACHINE  
Filed Jan. 14, 1924    10 Sheets-Sheet 6

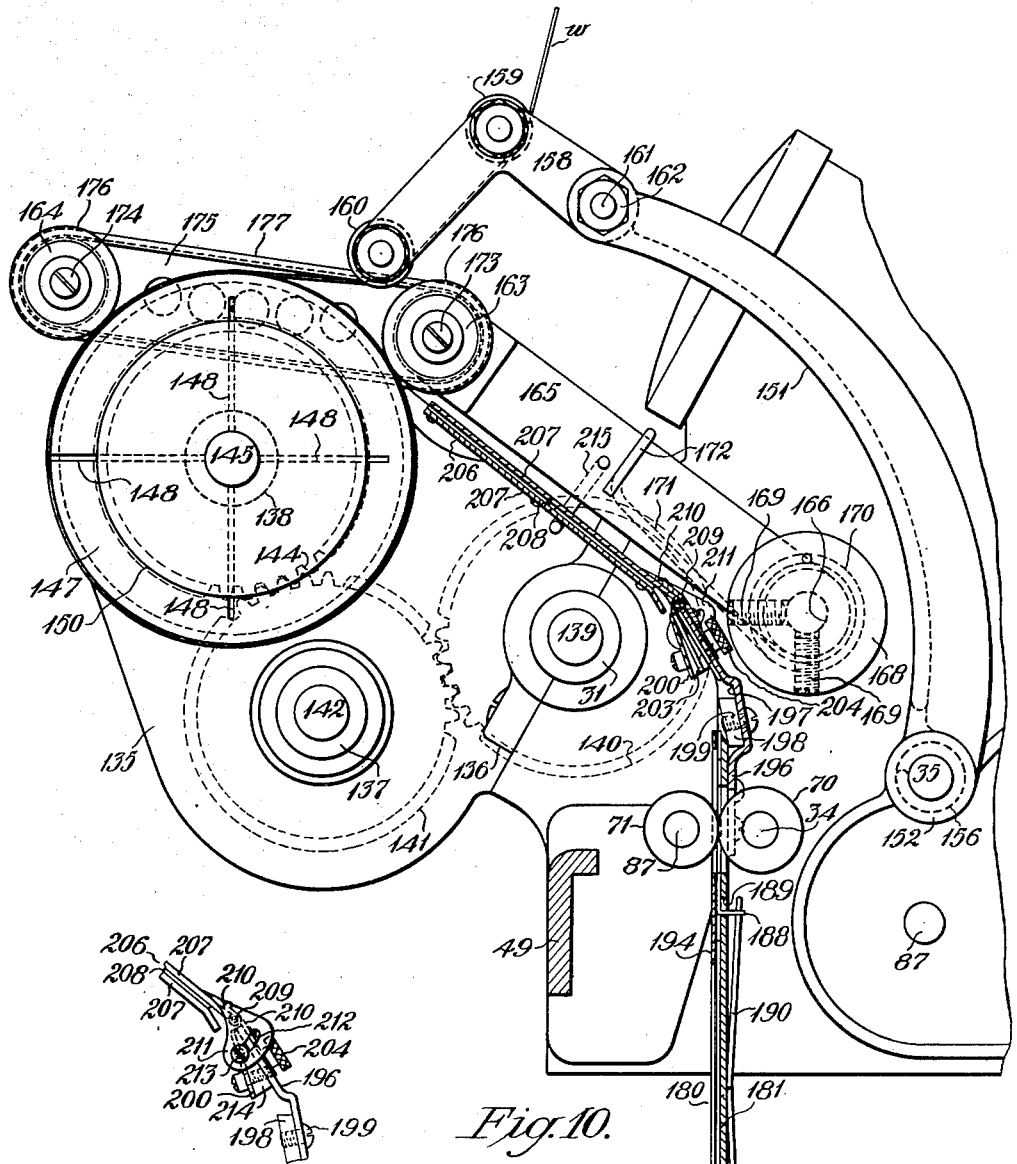

Feb. 23, 1926.

C. D. REYNOLDS 1,574,059

COIL WINDING MACHINE

Filed Jan. 14, 1924 10 Sheets-Sheet 10

Inventor:
Charles D. Reynolds,
By
Watson, Coit, Morse & Laindle,
Attorneys.

Patented Feb. 23, 1926.

1,574,059

UNITED STATES PATENT OFFICE.

CHARLES D. REYNOLDS, OF CRANSTON, RHODE ISLAND, ASSIGNOR TO UNIVERSAL WINDING COMPANY, OF BOSTON, MASSACHUSETTS, A CORPORATION OF MASSACHUSETTS.

COIL-WINDING MACHINE.

Application filed January 14, 1924. Serial No. 686,170.

*To all whom it may concern:*

Be it known that I, CHARLES D. REYNOLDS, a citizen of the United States, residing at Cranston, in the county of Providence, State of Rhode Island, have invented certain new and useful Improvements in Coil-Winding Machines, of which the following is a specification.

This invention relates to winding machines and particularly to machines for winding electrical coils with strips of paper or other insulating-material inserted between the layers of wire or conductor forming the coil.

One object of the invention is to provide a machine of the type specified having automatically-operated means for inserting the strips of paper into the coil at intervals during the winding to provide insulation between the layers of wire.

Another object of the invention is to provide means for supplying the paper from a continuous strip and for severing the strip as required to provide the proper length to be inserted into the coil.

Another object of the invention is to provide means for guiding the paper strip into place on the coil to insure its proper overlying relation with respect to the layers of wire.

Another object of the invention is to provide guiding- and feeding-means for the paper which are adjustable for strips of different widths for use in coils of varying dimensions.

Another object of the invention is to provide improved means for holding and pressing the strip of paper against the coil as it feeds into place thereon to insure that it will lie smoothly and flatly across the wire windings.

Another object of the invention is to provide a coil-winding machine having strip-feeding and -inserting means which are adaptable for use in winding coils having a wide range of variation in size.

Further objects of the improvement are set forth in the following specification which describes a preferred embodiment of the invention, with several modifications in the mechanism thereof, as illustrated in the accompanying drawings. In the drawings:

Fig. 10 is an enlarged side view of the strip-guiding mechanism or paper-chute and its associated presser-means shown in modified form as adapted for use in connection with the winding of a relatively large coil;

Fig. 11 is a detail view of the pivot mounting of the paper-chute extension.

For convenience of description the complete machine will be herein referred to as comprising a number of correlated units such as the driving-mechanism, traversing-mechanism, strip-feeding means, strip-severing or cutting-off means and strip-presser means.

Figure 1:
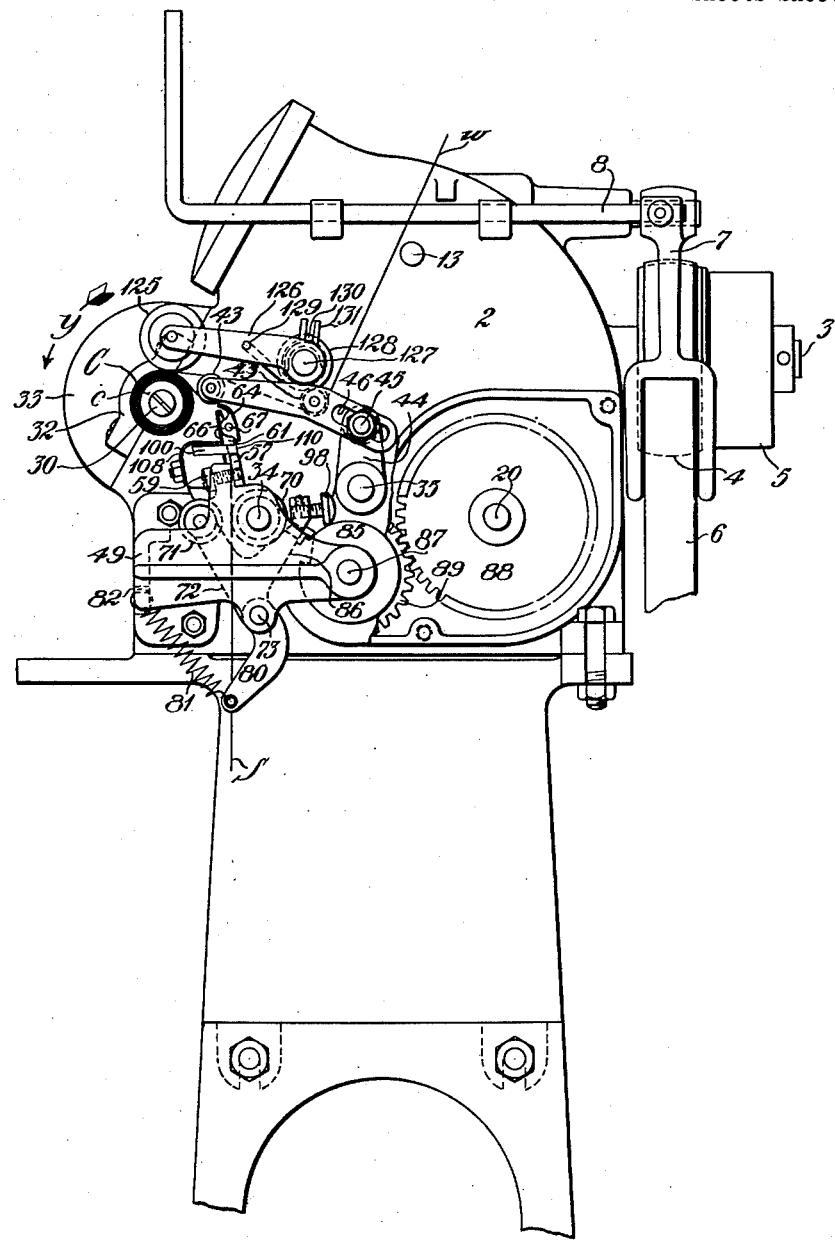
Fig. 1 is a side elevation of the improved winding machine showing the general arrangement of the paper-feeding means in connection with the winding-mechanism.

*Driving mechanism.*—Referring first to Figs. 1 to 4 of the drawings, 2 designates the box-like frame or casing enclosing the driving-mechanism of the machine and the traversing-means for operating the wire-guide which feeds the wire into place on the coil. As shown more particularly in Fig. 2, the machine is operated from a drive-shaft 3 carrying the usual fast-pulley 4 and an idler-pulley 5 at its outer end. As shown in Fig. 1, the shaft 3 is driven from a suitable driving-belt 6 which may be shifted from the idler-pulley 5 onto the fast-pulley 4 by means of a usual form of belt-shipper 7 operated from the sliding rod 8. The drive-shaft 3 is journaled in bearings 9 and 10 in the frame 2 and carries a worm or screw 11 located intermediate said bearings, see Fig. 2. The worm 11 meshes with a worm-gear 12 to drive a counter-shaft 13 which is connected to operate the traverse-mechanism of the machine through the means of intermediate change-gearing illustrated in Fig. 3. As shown in this view, the shaft 13 carries a pinion 14 meshing with a change-gear 15 which carries a pinion 16 fast therewith. The pinion 16 meshes with a gear 17 connected with a second pinion 18 which drives a larger gear 19 fast on the cam-shaft 20. The change-gears 15, 16, 17 and 18 are journaled at the ends of adjustable arms 21 and 22 so that gears of different diameter may be substituted therefor to adjust the ratio of speed between the cam-shaft and winding-spindle to regulate the traverse of the wire-guide in accordance with the thickness of the wire being wound. The cam-shaft 20 is journaled in bearings 23 and 24 on the sides of the frame 2, see Fig. 4, and carries the cylindrical cam 25, shown also in Fig. 2. The cam 25 is formed with a helical groove 26 for transmitting reciprocatory motion to the traverse-bar which carries the wire-guide, in the manner as later more fully explained.

Figure 2:
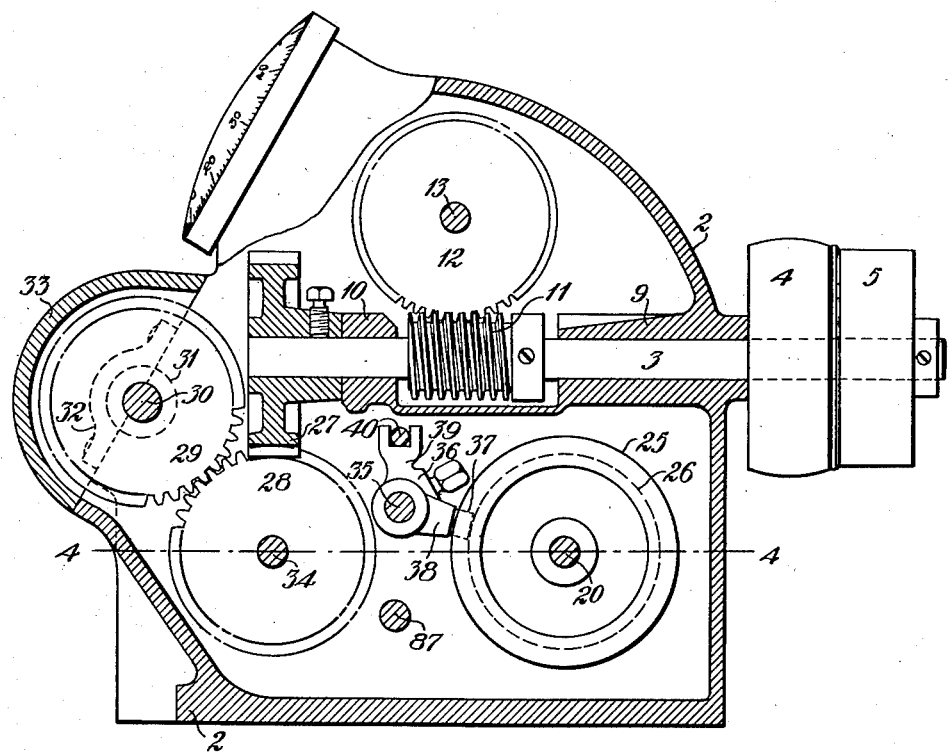
Fig. 2 is an enlarged vertical sectional view taken through the axis of the drive-shaft of the machine and illustrating the driving-mechanism in detail.
Figure 3:
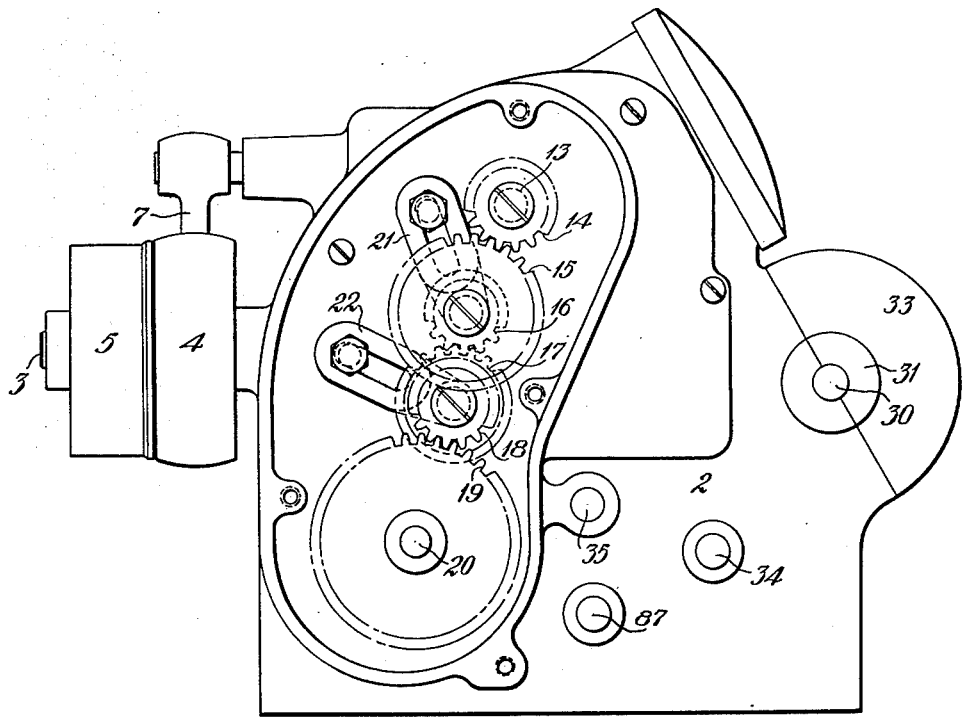
Fig. 3 is an enlarged side elevation of the winding machine, viewed in the opposite direction from that of Fig. 1, and illustrating the gainer-mechanism which controls the speed ratio between the winding-mandrel and guide-traversing means.

At the forward end of the main drive-shaft 3 of the machine is a spiral or skew-gear 27 which meshes with a similar gear 28 engaging an equal gear 29 fast on the winding-spindle 30, see Fig. 2. The winding-spindle 30 is journaled in bearings 31 on the forward side of the frame 2, which bearings have detachable caps 32 to adapt the spindle to be conveniently removed so that others of different arrangement and dimensions may be substituted therefor. The gearing for the winding-spindle 30 is housed within the frame 2 and enclosed by a removable cover 33 on its front, preferably constructed integral with the bearing-caps 32, see Fig. 2. As shown in Fig. 1, the winding-spindle 30 projects from the side of the frame 2 to adapt it to serve as a holder or mandrel for the core $c$ on which the coil C is wound. The gearing and driving-connections for operating the paper-feeding and cutting-off mechanisms will be described later in connection with these units of the machine, but it is to be noted here that the gear 28 for driving the spindle-gear 29 is fast on a shaft 34 which projects from the side of the frame 2 to adapt it to operate the paper-feeding means in the manner as later described.

Figure 6:
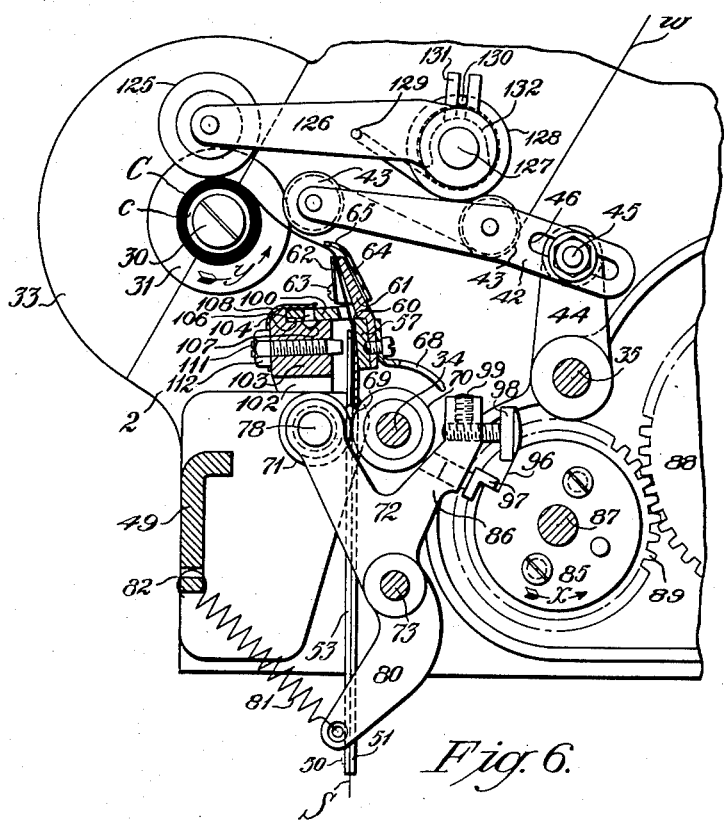
Fig. 6 is an enlarged side elevation of the paper-feeding means, showing it in connection with its operating mechanism.

*Traverse-mechanism.*—The traversing-means for the wire-guide which directs the wire or other strand of conductor onto the coil comprises essentially a reciprocable rod or traverse-bar 35 which slides in suitable bearings in the sides of the frame 2. As shown in Fig. 2, the traverse-bar 35 carries a traverse-slide or yoke 36 which connects it with the cam 25. For this purpose a stud or roller 37 is mounted on the end of one of the arms 38 of the yoke 36 to adapt it to engage the helical cam-groove 26 in the face of the cam 25. The other arm 39 of the yoke 36 is formed with a forked extremity adapted to straddle a guide-rod 40 extending horizontally between the sides of the frame 2, this connection serving to hold the yoke from turning so that the roll 37 is retained in the groove 26 of the cam 25. Referring now to Figs. 1 and 6, the wire-guide which traverses the wire $w$ on the coil C comprises essentially an arm 42 mounted on the end of the traverse-rod 35 which projects from the side of the frame 2, and carrying a pair of grooved wheels or pulleys 43 journalled thereon. The guide-arm 42 is fastened to an arm 44, fixed on the traverse-bar 35, by means of a bolt 45 inserted through a slot 46 in the arm 42. This arrangement adapts the guide-arm 42 to be adjusted so that its forward guide-pulley 43 may be set in close relation to the winding-spindle as regulated by the diameter of the coil to be produced. It will be understood that as the cam 25 is rotated from the driving connections previously described, the traverse-bar 35 will be reciprocated longitudinally in its bearings and the wire-guide 42 will be traversed back and forth at a relatively slow rate of speed to adapt it to feed the wire onto the coil in closely laid spirals or helices. The length of the coil is regulated by the extent of traverse of the wire-guide which is adjusted by substituting cams with grooves of different length.

Figure 4:
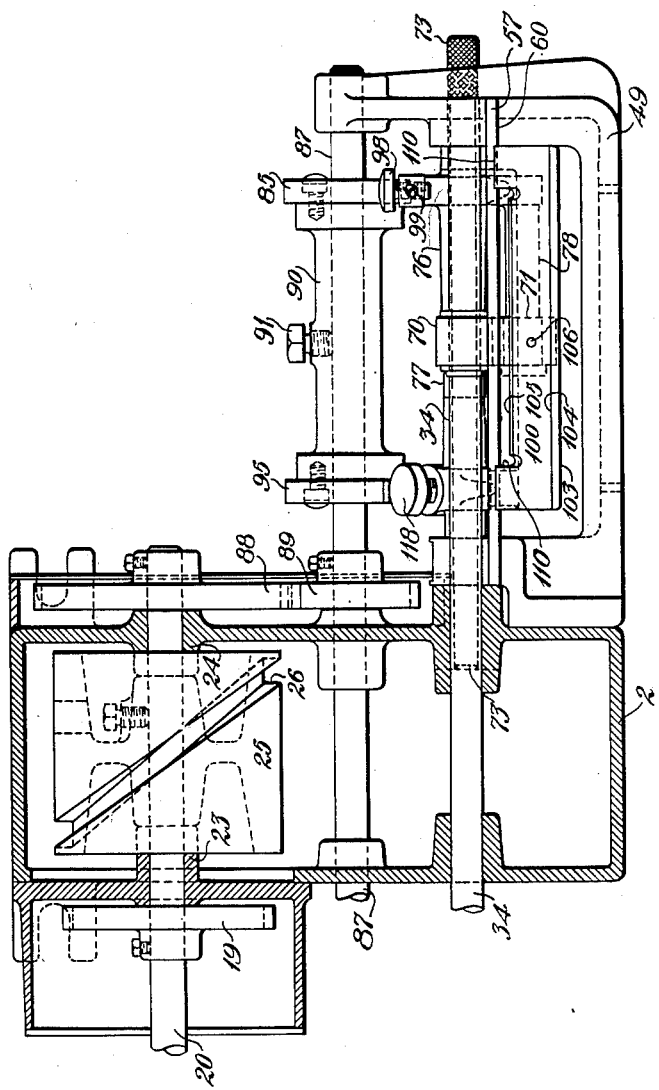
Fig. 4 is a plan view of the machine showing its frame or casing in section taken on the line 4—4 of Fig. 2.
Figure 5:
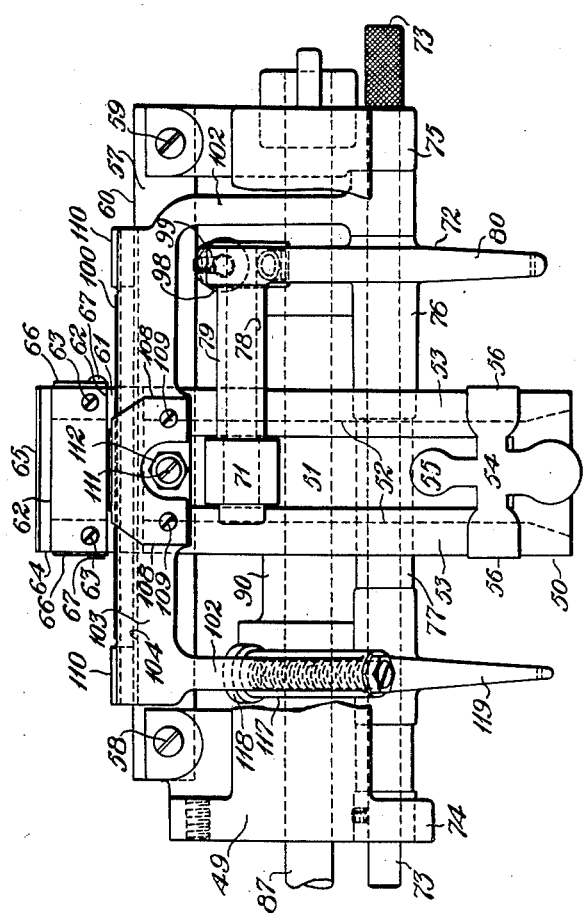
Fig. 5 is an enlarged detailed view of the strip-guiding means for the paper-feeding mechanism.

*Strip-feeding means.*—The paper-feeding means for the machine is mounted on a U-shaped bracket 49, illustrated in plan view in Fig. 4, which is fastened to the side of the machine frame 2 beneath the winding-spindle 30. Fig. 5 shows the bracket 49 in side view, and illustrates the paper-chute 50 which directs the paper-strip to the coil as mounted in vertical position on the bracket. As shown in this view, and also in Figs. 6, 8 and 9, the paper-chute 50 comprises a sheet-metal back-plate 51 having raised abutments or ledges extending along its opposite sides to form guideways for the edges of the paper, and overlying flanges 53 which hold the paper-strip S in place between the guideways of the chute. The paper-strip S enters at the bottom of the chute 50, and drawing up between the guiding-ledges 52, feeds to the coil C from the top. At the bottom of the chute 50 is a spring-element or strip-retainer 54 formed with a finger 55 adapted to bear against the face of the paper to hold it flat against the back-plate 51 and to provide a slight resistance to its movement. The spring-element or strip-retainer 54 may be formed of sheet-metal, as shown in Fig. 5, with opposite arms 56 bent around to embrace the sides of the chute 50 to hold it in place.

Extending across the top of the bracket 49 is a flat bar or blade 57 held at its ends by screws 58 and 59 screwed into the upright members of the bracket. The blade 57 has an upper sharpened edge 60, see Fig. 6, which forms the knife for cutting off the paper-strip in the manner as explained more fully hereinafter. The knife-blade 57 also serves to support the paper-chute 50 from the bracket 49. Referring to Fig. 6, at the upper, delivery end of the chute 50 is a paper-guide comprising an angular strip 61 fastened to the back of the knife-blade 57 with a thinner strip or plate 62 extending across its front in spaced relation thereto, and fastened by the screws 63. Overlying the top of the guide-piece 61 is a sheet-metal guard or cowl-plate 64 having a curved upper lip 65, the guard being provided with ears 66, shown in Fig. 1, fastened to the ends of the strip 61 by means of pins or screws 67. Through this arrangement the cowl or guard 64 may be adjusted in position to adapt it to direct the paper strip as it feeds to the coil across the edge of the guide-plate 62.

Figure 7:
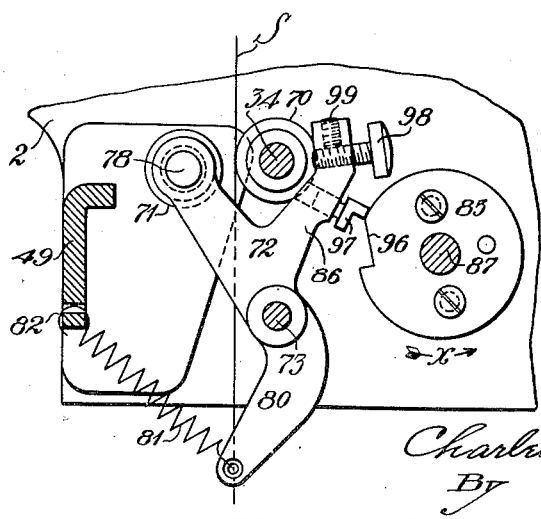
Fig. 7 is a detailed view of the trip-mechanism for the feed-rolls.
Figure 8:
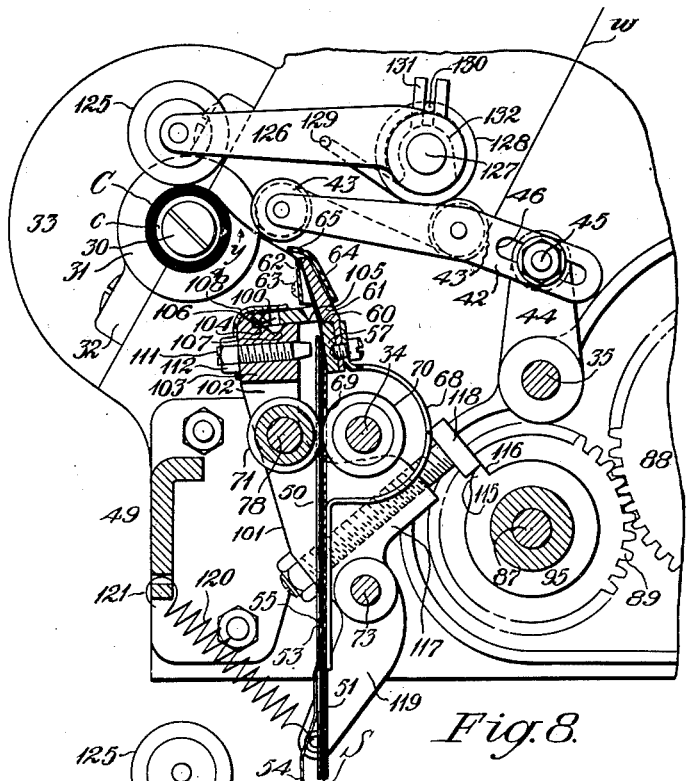
Fig. 8 is an enlarged detail view of the cutting-off devices of the paper-feeding mechanism.
Figure 9:
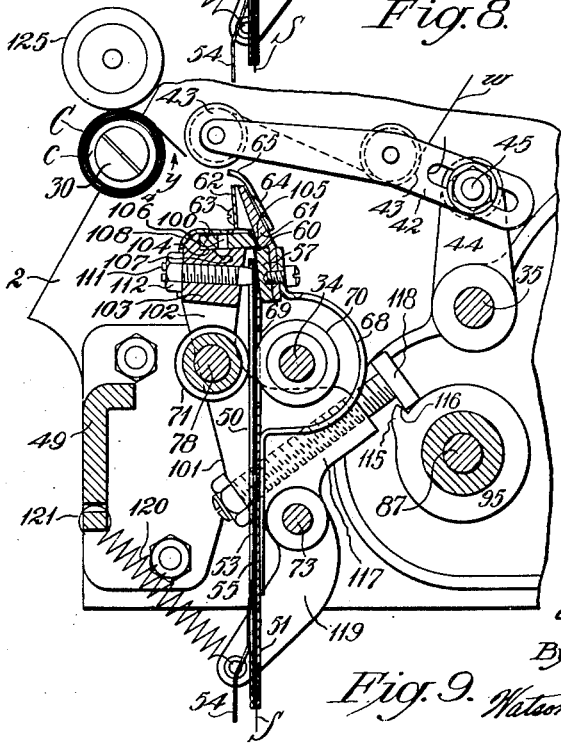
Fig. 9 is a similar view showing the cutting-off devices at a later stage in their operation.

*Strip-feeding rolls.*—Referring to Figs. 6, 8 and 9 of the drawings, it will be noted that the vertical back-plate 51 which constitutes the main portion of the paper-chute 50 is cut away with an opening 69 near the top, and arranged opposite the opening with its periphery projecting slightly therethrough is the fixed feed-roll 70. Fastened to the back of the knife-blade 57 of the chute 50 is a sheet-metal plate 68 formed with a curved guard-portion surrounding the periphery of the roll 70 to protect it from interference. The feed-roll 70 is fast on the end of the continuously rotating shaft 34 previously described as being driven from the main drive-shaft 3 of the machine through the gears 27 and 28 shown in Fig. 2. Arranged on the opposite side of the chute 50 is an auxiliary, presser feed-roll 71 carried by a rockable lever 72, see Figs. 6 and 7. The lever 72 is pivoted on a shaft 73 held in bearings 74 and 75 on the bracket 49, see Fig. 5. As shown in this view the lever 72 has a relatively long hub 76 surrounding the shaft 73 and held from longitudinal movement thereon by a sleeve 77 and the hubs of certain other elements to be later described. It will also be noted from this view that the presser-roll 71 is journaled on a pin or stud 78 held in a relatively long hub or boss 79 projecting from the side of the main arm of the lever 72. The lever 72 has a lower arm 80, to the end of which is connected a coiled spring 81 anchored at 82 to the bracket 49, see Figs. 6 and 7. The spring 81 tends to rock the lever 72 on its pivot 73 to carry the presser-roll 71 into contact with the face of the fixed-roll 70. The paper-strip S is fed through the chute 50 between the peripheries of the two rolls 70 and 71, and when the rolls are in the position illustrated in Fig. 6 the presser-roll 71 will hold the paper against the roll 70 to cause it to be fed from the rotation of the latter. This feeding action of the rolls 70 and 71 takes place only at intervals of the winding when the paper-strip S is to be projected into the coil C. Normally, while the wire is being traversed on the coil before the completion of a layer, the presser-roll 71 is held away from the feed-roll 70 by a cam 85 acting on an arm 86 of the rockable lever 72, as shown in Fig. 7.

*Feed-controlling means.*—The cam 85 is mounted fast on a shaft 87 illustrated in Fig. 4 as being driven continuously from the cam-shaft 20 by means of gears 88 and 89. The cam 85 is secured to the end-flange of a spool-like member 90 held fast on the shaft 87 by means of a set-screw 91. The member 90 also carries another cam 95 at its opposite end which is adapted to operate the strip-severing or cutting-off mechanism to be later described. Referring now to Figs. 6 and 7, the cam 85 is formed with a circular periphery interrupted by a square-shouldered notch 96. Projecting from the side of the arm 86 of the lever 72 is a hardened L-shaped contact-piece or follower 97 adapted to normally ride on the periphery of the cam 85 as the latter rotates in the direction indicated by the arrow x, and to drop into the notch 96 on the edge of the cam at a predetermined stage in the operation of the machine. As the follower 97 rides on the peripheral rim of the cam 85 it maintains the presser-roll 70 away from contact with the paper-strip S as shown in Fig. 7, but when the follower drops into the notch 96 it will permit the lever 72 to be rocked by the spring 81 to carry the presser-roll 71 against the strip to press the latter into contact with the positively-rotated feed-roll 70.

Screwed into the end of the arm 86 of the lever 72 is a mushroom-headed screw 98 which is locked in place by a set-screw 99. It will be noted by reference to Fig. 6 that the head of the screw 98 is adapted to bear against the end of the notch 96 in the cam 85 when the follower 97 drops into the notch, this contact serving to cause the lever 72 to be tilted back as the cam continues to rotate, whereby to again remove the presser-roll 71 from contact with the paper-strip. The screw 98 thus serves as an adjustable means for regulating the extent of feed of the paper-strip through the chute 50. That is to say, by adjusting the screw 98 the mechanism may be set to cause the presser-roll 71 to be retracted from the strip S at an earlier or later stage of the feed whereby the length of strip fed to the coil is regulated.

*Strip-severing means.*—The movable knife-blade 100 which cooperates with the fixed blade 57 to sever the paper-strip across its width, is mounted on a rockable lever 101 shown in detail in Figs. 5, 8 and 9. The lever 101 is pivoted on the rod 73 on which the presser feed-roll lever 72 is also mounted. The lever 101 is yoke-shaped, its opposite arms 102 reaching upwardly from the pivot-rod 73 and connected by a cross-arm 103 which is recessed along its top to provide a seat 104 for the knife-blade 100. The blade 100 has a floating bearing in its seat 104 on the cross-arm 103 to adapt its forward cutting edge 105 to properly aline and register with the upper sharpened edge 60 of the fixed blade 57. For this purpose the blade 100 is provided at its center with a pin or stud 106 having a rounded head adapted to be received within a tapered socket or depression 107 on the top of the cross-arm 103. A spring-clamp or clip 108, fastened to the back of the cross-arm 103 by means of screws 109, see Fig. 5, is bent over across the top of the cross-arm to adapt it to bear at its end on the top of the blade 100. The clip 108 serves to hold the blade 100 in place and the rounded bearing or pivot at the end of the stud 106 acts as a ball-and-socket joint so that the blade can rock slightly to adapt it to aline with the edge of the fixed knife 57 as the lever 101 swings on its pivot. To maintain the knife-edges in proper relation the movable blade 100 is provided with projecting fingers 110 at its end, see Figs. 4 and 5, which rest across the upper edge of the fixed-blade 57. It will thus be seen that as the movable blade 100 is slid across the upper edge of the fixed-blade 57 the cutting edges of the two blades will be at all times maintained in alinement to meet squarely to sever the paper-strip with a clean cut. When the blade 100 requires sharpening it may be slipped out of its bearing by releasing the spring-clip 108.

Beneath the knife-blade 100 is a stop-screw 111 which is adjustable in the cross-arm 103 of the lever 101 and locked in place by a nut 112. The forward end of the screw 111 may be covered with a rubber tip which serves as a bumper or buffer as it strikes against the side of the fixed-blade 57 to limit the swinging movement of the lever 101 when the knives cooperate in their cutting action.

*Knife-operating means.*—The lever 101 carrying the movable knife-blade 100 is operated from the cam 95, shown in Figs. 4, 8 and 9, and previously referred to as being fastened to the end of the spool-like member 90 which carries the cam 85 for the paper-feed mechanism. As illustrated most clearly in Figs. 8 and 9 the cam 95 is formed with a cylindrical periphery from which projects a rounded lug or nose 115 having a radially-extending square shoulder 116. On the rearward arm 102 of the lever 101 is a hub or boss 117 into the end of which is screwed a flat-headed stud 118. The periphery of the head of the stud 118 is adapted to bear against the rim of the cam 95 and to be acted upon by the projecting cam-nose 115 to tilt the lever 101 to the left, as viewed in Fig. 8, whereby to open a space between the cutting-edges of the knife-blades 100 and 57 so that the paper-strip S can be projected from the chute 50 before being severed. Reaching down from the lever 101 is an arm 119, to the end of which is fastened a coiled spring 120 anchored at 121 to the bracket 49. The spring 120 resists the rocking movement of the lever 101 as the head of the screw 118 rides up onto the cam-nose 115; and as the cam 95 turns into position to release the screw from the cam-nose the spring will act to swing the lever 101 in the opposite direction with a quick action which causes the cutting edges of the knife-blades to coact to shear the strip of paper extending between them, it being understood that the radial shoulder 116 on the cam 95 allows for a sudden drop of the head of the screw 118 from the high point on the cam to the low point thereof.

*Strip-presser.*—It will be understood that the strip of paper or other sheet-insulation is fed to the coil after the completion of a layer of turns of wire on the coil and as the edge of the strip is carried beneath the wire it will be gripped and carried around the coil in one or several wraps in accordance with the requirements for which the machine is adjusted. As the paper-strip is laid on the surface of the coil the presser-means comes into play to hold the strip against the wire windings and to smooth it out and iron it into place so that it will be laid on the coil without skewing and without wrinkling or buckling at its edges. For this purpose a presser-roller 125 is employed to normally bear against the periphery of the coil and to press against the paper-strip as it wraps therearound. As illustrated in Figs. 1, 6, 8 and 9, the presser-roller 125 is carried at the end of a swinging arm 126 which is pivoted on a rod 127 projecting from the side of the frame 2. A helical spring 128 is coiled around the hub of the arm 126 with one of its ends inserted through a hole 129 in the arm, the opposite end 130 of the spring being held in a slot in a lug 131 projecting from a suitable collar 132 fast on the rod 127. The spring 128 acts to maintain the presser-roller 125 bearing firmly against the top of the coil C while permitting the roller to rise with the swinging of the arm 126 as the coil increases in diameter.

Figure 12:
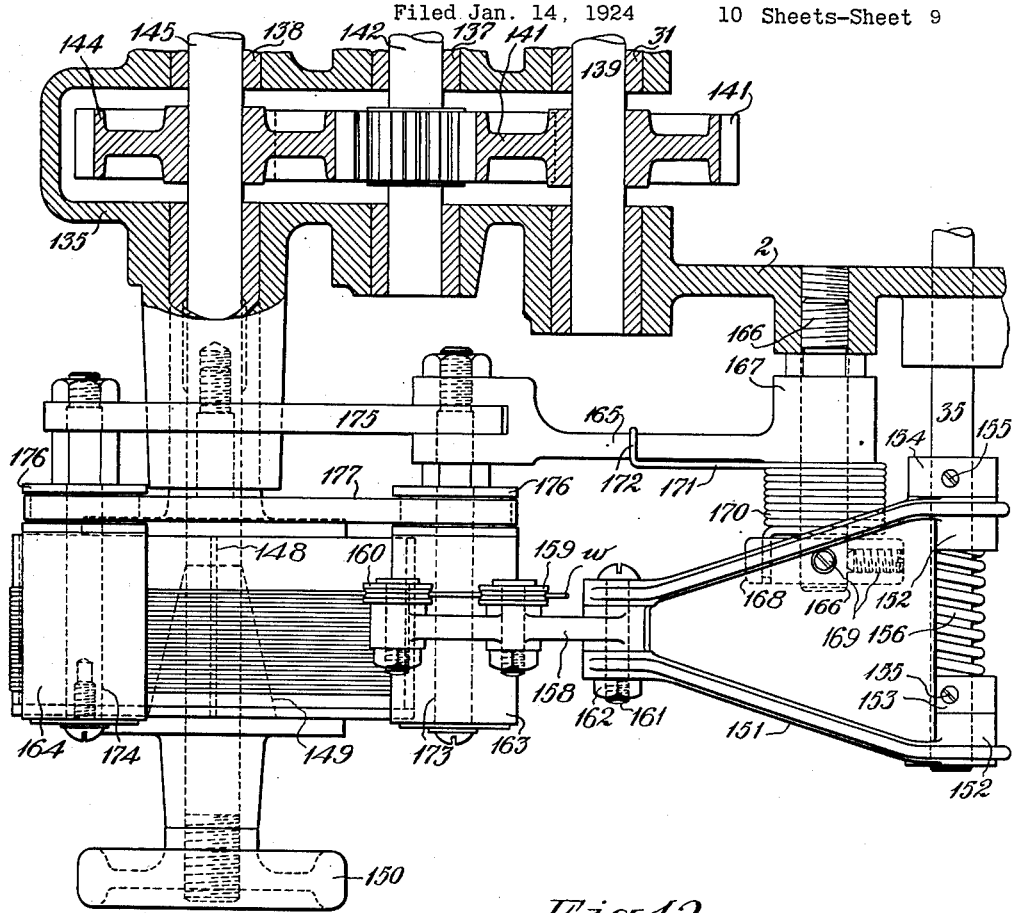
Fig. 12 is a plan view of the strip presser-means.

*Method of operation of the machine.—* One preferred embodiment of the invention having now been described the method of operation of the complete machine will next be explained, the description of the modifications in the parts of the mechanism as shown in Figs. 10, 11 and 12 being reserved until later.

Referring first to Fig. 1, to prepare the machine for operation a suitable core or tube $c$ is placed on the winding-spindle 30 and the wire $w$ or other strand of conductor is led down from its source of supply (not herein shown) to the wire-guide. The wire $w$ is led through the grooves in the pulleys or guide-rolls 43 on the guide-arm 42 and its end fastened to the core $c$ on which it is to be wound, the wire leading under the rearward guide-roll, up over the forward guide-roll, and then to the coil. The strip S of paper or other insulating-material is led from a roll located below the machine, but not herein illustrated, and is fed up through the chute 50 with its edges guided between the side-members or abutments 52, see Fig. 5, which project from the back-plate 51; it being understood that the overlapping flanges 53 hold the paper in place in the chute, while the spring-finger 55 on the clip 54 acts to provide a slight friction to prevent the strip from dropping out of the chute. The strip S leads up between the peripheries of the two feed-rolls 70 and 71 and is thence directed toward the coil C by means of the inclined guide-plate or bar 62 and its overlying cowl or guard 64, see Fig. 6. It will be understood that when the paper is inserted in the chute 50 the end of the strip will not be carried up past the knife-blades 100 and 57 because normally the knives are closed, as shown in Fig. 9, while the head of the stud 118 is riding on the circumferential edge of the cam 95. Likewise it will be understood that normally the paper-feed roll 71 is held away from the continuously rotated roll 70 so that the paper will not be gripped between the rolls to be fed thereby.

To start the operation of the machine the belt-shipper 7, shown in Fig. 1, is shifted to carry the belt 6 onto the driving-pulley 4 and the shaft 3 will be driven therefrom to drive the gearing within the frame 2 of the machine to rotate the various operating shafts in the manner as previously explained. As the machine operates the winding-spindle 30 will be rotated in the direction indicated by the arrow $y$, Figs. 1, 6, 8 and 9, and the wire strand $w$ leading through the guide-wheels 43 will be traversed back and forth along the core $c$ to cause it to be laid in closely adjacent helices which form the overlying layers of the coil. It will be understood that the coil C is usually wound with enameled or covered wire so that the turns of the wire in the separate layers are insulated from each other and the overlying layers are also insulated one from another. However, it has been found expedient to insert additional insulation between the layers of the coil at certain intervals to adapt the coil for certain purposes. That is to say, strips of insulation may be inserted between each two layers of the coil, or in some cases the strips are inserted after several layers have been completed. My improved machine is adapted for either practice by adjustment of its mechanism, particularly with respect to the timing of the operation of the feeding- and severing-means for the paper.

During the operation of the machine the shaft 87, carrying the cams 85 and 95 for controlling the operation of the paper-feeding and severing-means, is driven continuously from its gear 89 meshing with the gear 88 on the shaft 20 which carries the traverse-cam 25 of the machine. The cam 95 is adjusted on the shaft 87 so that just previous to the completion of a layer of winding the nose 115 on the cam will come into juxtaposition with the head of the stud 118 on the knife-carrying lever 101 to tilt the latter back to withdraw the movable knife 100 away from the fixed knife 57 so that a space will intervene therebetween through which the paper S may be fed. As the knives are opened in this manner the cam 85, also rotated from the shaft 87, comes around into position to allow the follower 97 to drop into the notch 96 on its periphery. This action allows the spring 81 to rock the lever 72 to carry the presser-roll 71 against the strip S to press the latter against the opposite roll 70 which is being continuously rotated from the winding mechanism. Immediately this engagement of the rolls 70 and 71 with the paper takes effect the strip will be projected rapidly upward in the chute 50, it being understood that the feed-roll 70 is rotated at a high rate of speed for this purpose. The end of the strip S is guided by the inclined portion 61 of the chute and the overhanging cowl 64 to direct the paper in under the wire-guide and also beneath the strand of wire $w$ leading from the forward pulley 43 to the coil C. The leading edge of the paper is thus caused to be fed in under the wire strand $w$ as the latter is wound onto the coil C, see Fig. 8, so that the strip will be bound to the coil to be drawn from the chute 50 and wrapped around its periphery. Now, after a sufficient length of strip has been fed through the chute, the length being predetermined by the adjustment of the feeding-mechanism and the severing-means, the latter means is brought into action to sever the strip. As before explained, the action of the knives is effected by the release of the stud 118 from the cam-nose 115 which allows the head of the stud to drop down against the periphery of the cam 95. This release is abrupt, as above noted, and the spring 120 which controls the lever 101 acts to tilt said lever to carry the forward edge 105 of the knife 100 across the upper edge of the knife 57 with a quick action to cut the strip across at right-angles. After the paper is severed and released from the chute, as shown in Fig. 9, its end will be drawn into the coil C and wrapped therearound to be covered by the turns of wire being wound over it. The presser-roller 125 bears across the full width of the strip S as the latter wraps around the coil to hold it thereagainst and prevent it from skewing, buckling or wrinkling as it feeds into the coil. It will be understood that as the strip-feeding and severing mechanism is operated from the traverse-mechanism of the machine its action may be timed so that a strip will be fed into the coil after each layer of turns is completed or, if desired, after any certain number of layers are completed. The improved device acts efficiently with great accuracy and precision to properly insert the strips of insulating material into the coil, and furthermore a smooth, even laying of the strips in place is assured by the action of the presser-means in the manner as explained.

*Modifications in the form of the invention.*—Figs. 10 to 13 illustrate the machine as equipped for winding coils of larger diameter than those for which the machine as first described is adapted. In this modification of the invention the caps 32 for the spindle-bearings 31 and the cover for the spindle gearing are removed and a larger gear-enclosing casing 135 substituted therefor, see Fig. 10. The casing 135 has caps 136 for the spindle-bearings 31 and also carries additional bearings 137 and 138. The winding-spindle 30 is replaced by a shaft 139 carrying a gear 140 which is driven from the gear 28 shown in Fig. 2. The gear 140 meshes with a pinion 141 on a counter-shaft 142 journaled in the bearings 137 of the casing 135. Journaled in the bearings 138 is the winding-spindle 145 which carries a gear 144 driven from the pinion 141. The spindle 145 projects from the side of the casing 135 and carries an enlarged hub or mandrel 147 which may serve as the core for the coil to be wound. As shown in Figs. 10 and 12, the hub or mandrel 147 is split at 148 diametrically of its axis and formed with a tapered recess or bore into which is fitted a conical expansion plug 149 which is slidable on the winding-spindle 145. This form of construction provides for expanding the mandrel by means of a handnut 150 threaded to the end of the spindle 145 as shown in Fig. 12, the nut acting to slide the plug 149 to spread the segments of the mandrel 147 in the manner as well known to those versed in the art. After the coil is completed the mandrel 147 may be contracted by releasing the nut 150 whereby the coil can be removed therefrom.

With the present adaptation of the machine a curved guide-arm 151 is fastened to the end of the traverse-rod 35 to replace the arm 42 shown in Fig. 1. The main portion of the guide-arm 151 is forked and provided with opposite hubs 152 pivoted on the traverse-rod 35, see Fig. 12. Abutting the inner sides of the hubs 152 are collars 153 and 154 held fast on the rod 35 by means of setscrews 155. Between the collar 153 and the side of one of the hubs 152 is a helical spring 156 coiled about the rod 35 and adapted to normally hold the guide-arm 151 in position with its hubs abutting the faces of the collars 153 and 154. The spring 156 is further adapted to serve as a buffer so that should the guide strike any obstruction during its traverse inwardly towards the frame of the machine the spring will yield to allow the arm to slide on its rod to protect the parts from damage or breakage. Further than this, the spring acts to provide a friction between the hubs 152 of the arm and the collars 153 and 154 to hold the arm in the position to which it is adjusted in setting the forward guide-wheel 43 in adjacent relation to the winding-mandrel. As shown in Figs. 10 and 12, the guide-arm 151 carries an elbow-shaped extension 158 at its upper end, on which are journaled a pair of guide-wheels or pulleys 159 and 160. The extension 158 has a hub held between the sides of the forked end of the main arm 151 by means of a bolt 161 secured in place by a nut 162. This provides for adjusting the extension to bring the lower guide-pulley 160 in close relation to the surface of the mandrel on which the winding is performed; it being understood that the whole arm may be adjusted to regulate the position of the guide-pulley in accordance with the maximum diameter of the coil to be produced.

In place of the single presser-roller employed on the type of machine first described, with the present construction a pair of rollers 163 and 164 are used to bear against the coil to press the insulating sheets into place thereon. The two rollers 163 and 164 are carried by a swinging arm 165 pivoted on the end of a stud 166 screwed into the side of the main frame or casing 2 of the machine. The presser-roller arm 165 is formed with a hub 167, see Fig. 12, mounted on the stud 166, and fast on the end of the stud is a fixed collar 168 held by set-screws 169. Between the end of the hub 167 and the collar 168 is a helical spring 170 arranged with its outer end inserted in a hole in the collar. The opposite end of the spring 170 is extended in an arm 171 formed with a loop 172 at its end hooked across the top of the presser-roller arm 165. The spring 170 is thus caused to swing the arm 165 downwardly to maintain the presser-rollers 163 and 164 bearing against the coil in the manner as later explained. The presser-rollers 163 and 164 are journaled on studs 173 and 174, the stud 173 extending through a forked extremity at the end of the arm 165 to attach thereto an extension 175 in which the other stud 174 is held. The outer roller 164 is thereby adapted to swing with respect to the axis of the roller 163 on the main arm so that both rollers may be maintained at all times in contact with the surface of the coil. The two rollers 163 and 164 carry flanged pulleys 176 at their inner ends which are connected by an endless belt 177 to adapt the rollers to rotate in unison as driven by their contact with the surface of the coil. The purpose of this arrangement is to provide that when the paper-strip is feeding into place on the surface of the coil it will be acted upon by the two rollers 163—164 to properly feed it around the coil without permitting it to buckle or bulge upwardly between the rollers.

With the machine equipped as last described a different form of paper-chute is employed having an extension which swings with the presser-roller arm 165 so that its mouth or guiding-end is at all times maintained in proper relation with the periphery of the coil. As shown more particularly in Figs. 10, 11 and 13, the paper-chute 180 comprises a vertical back-plate 181 which is supported from the fixed knife-blade attached to the bracket 49 which supports the chute 50, first described. With the present form of chute the guiding-means for the edges of the paper-strip are made adjustable so that different widths of paper may be used in the machine in accordance with the requirements of coils of different lengths. For this purpose the main paper-guides are constructed in the form of sheet-metal strips 182 and 183 having folded-over flanges 184 overlapping the edges of the paper. At their bottom ends the paper-guides 182 and 183 have feet or extensions 185 bent into U-shape or box-like form to provide runners adapted to project through a horizontal slot 186 in the lower widened portion 187 of the back-plate 181. Near their upper ends the guides 182 and 183 are cut away to form ears 188 which are bent at right angles to the main strip to adapt them to be inserted through a guide-slot 189 extending horizontally across the back-plate 181. The guides 182 and 183 are held in place against the front of the back-plate 181 by means of wire spring-elements or clamps 190 on the back of the plate. These wire clamps 190 are bent into zigzag shape and are slightly bowed between their ends. The ends of the wires are inserted through holes in the feet or slides 185 of the guides and also through holes in the upper ears 188 and then sprung into place against the rear face of the back-plate 181. Through this arrangement the two paper-guides may be adjusted toward or away from each other in accordance with the width of the paper being fed through the chute. To hold the strips against accidental displacement a pair of slotted clamps or cleats 191 are fastened against the back-plate 181 by means of screws 192, the clamps having offset portions 193 adapted to bear against the guides to bind them against the back-plate.

Figure 13:
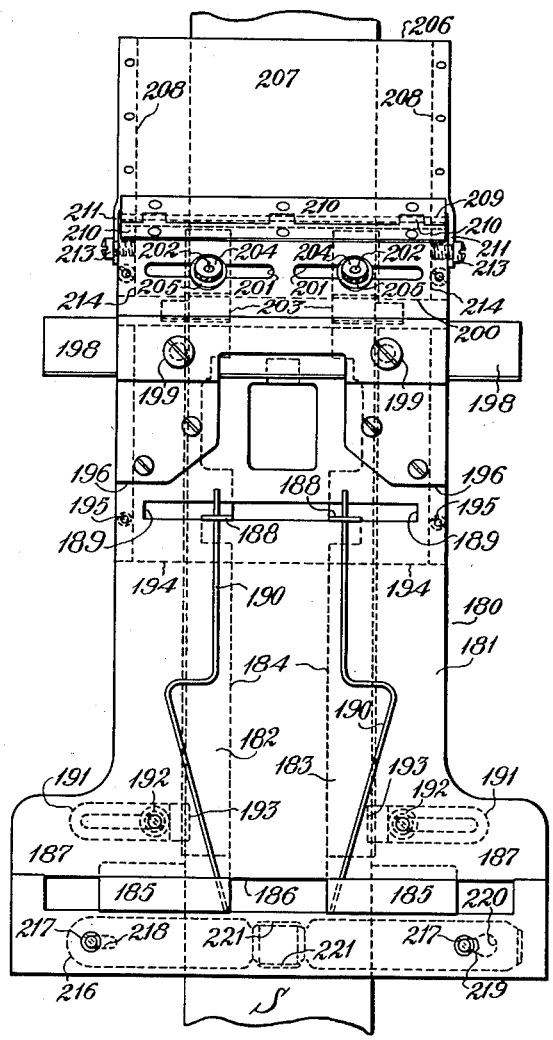
Fig. 13 is a detail view of the adjustable strip-guiding means or paper-chute.

Extending across the top of the back-plate 181 is a flat guard-piece 194 secured in place over the guide-strips 182 and 183 by means of screws 195. Fastened to the rear of the top-plate 181 is an extension-plate 196 reaching up across the top of the chute and recessed at 197 to adapt it to receive the fixed knife-blade 198 to which it is fastened by means of screws 199. The upper portion of the extension-plate 196 is inclined to the vertical in the direction of the winding-spindle and is provided with a forward guard or horizontal guiding-strip 200. Referring to Fig. 13, the extension-plate 196 is slotted at 201 to receive screws 202 which project from a pair of auxiliary paper-guides 203. Screwed onto the ends of the screws 202 are thumb-nuts 204 adapted to bind against washers 205 bearing against the back of the extension-plate 196 to hold the auxiliary paper-guides 203 in adjusted position thereon. The paper-guides 203 consist of folded strips of sheet-metal adapted to enclose and overlap the edges of the strip of paper S as shown most clearly in Fig. 10. The opposite folded portions of the guides 202 incline toward each other at the top to provide a contracted mouth through which the paper issues whereby it is more accurately guided and directed outwardly from the main chute 180.

Pivoted to the top of the main chute 180 is a hinged extension-chute 206 comprising overlapping plates 207 riveted together at their ends and held apart by means of side-strips 208. The chute-extension 206 is pivoted to the main chute 180 by means of a pin 209 held in suitable ears 210, as shown in Fig. 11. Projecting downwardly from the sides of the chute-extension 206 are ears 211 provided with arcuate slots 212 through which extends screws 213 secured in the strips 214 which hold the guide-plate 200 at the front of the extension plate 196, the screws 213 acting to limit the swinging movement of the chute-extension 206.

Referring to Fig. 10, a wire rod 215 has its end inserted through the side of the presser-roller arm 165 and reaches down in a loop engaging the underside of the chute-extension 206. The wire rod 215 acts to raise the chute-extension 206 as the arm 165 swings upwardly under the pressure of the presser-rollers 163—164 during the increase in diameter of the coil being wound. In this way the upper delivery end of the chute-extension 206 is maintained constantly in position to guide the strip S tangentially onto the periphery of the coil C at a point where the presser-roll 163 bears thereagainst.

At the bottom of the chute 180 is a friction-device or retainer for pressing the paper against the back-plate 181 to prevent it from dropping out of the chute. The retainer consists of a cross-strip 216 of thin sheet-metal held at its ends by means of headed screws 217. One of the screws 217 reaches through a slot 218 in the end of the strip and the other screw is inserted through a "button-hole" 219 at the opposite end of the strip. The button-hole 219 has an enlargement 220 at its end so that when the strip is bowed outwardly the enlargement can be passed over the head of the screw 217 to release the strip at this end. This construction provides for unfastening one end of the strip 216 and swinging it out of the way when the paper strip S is being placed in position in the chute. The central portion of the strip 216 is narrowed at 221 and struck up with side-flanges in a sort of box-like form. This box or presser 221 is held in close relation with the face of the back-plate 181 by bowing the strip inwardly. The presser-strip 216 is of tempered spring-metal so that in its bowed form it will be held by the screws 217 with its central portion 221 bearing firmly on the paper strip S to press it against the back-plate 181.

With this last described construction of the machine the paper strip S is inserted in the chute 180 by removing the friction presser-strip or retainer 216, in the manner as just explained, and leading the paper up between the edge-guides 182 and 183. It will be understood that as with the form of paper-chute first disclosed the present chute 180 is provided with openings through which the feed-rolls 70 and 71 project to bear against the paper to feed it to the coil in the manner as previously explained. When the feed-rolls come into operation the strip is fed rapidly upward between the paper-guides 203 which direct it into the chute-extension 206 whence it is fed to the coil C. As the paper feeds out from the extension 206 its end is directed under the presser-roller 163 and bound thereby against the coil so that after it has been cut off it is carried around by the coil and bound into place under the strand of wire $w$ as the coil rotates. The paper is thus wrapped around the periphery of the coil and the two presser-rollers 163 and 164 press it into place and iron it out smoothly across the coil while the wire $w$ is being laid across its surface. As before stated, the last described modifications in the structure of the machine provide for winding a coil of relatively large diameter and for properly inserting the strips in such a form of coil while the winding is being performed.

Various other modifications may be made in the construction and arrangement of the parts of the machine without departing from the spirit or scope of the invention and, therefore, without limitation as to the exact disclosure made, I claim:

1. In a coil winding machine, the combination with the winding-mandrel and means for guiding the conductor onto the mandrel, of means for inserting sheets of insulating-material into the coil at intervals of the winding comprising a pair of feed-rolls between which the insulating-material feeds, one of said rolls being continuously driven from the winding mechanism of the machine, and means controlled from the winding mechanism to cause the paper to be periodically gripped between and fed by the rolls at predetermined intervals of the winding.

2. In a coil-winding machine, the combination with the winding-mandrel and means for guiding the conductor onto the mandrel, of means for inserting strip insulating-material into the coil at intervals during the winding comprising a plurality of feed-rolls between which the strip feeds, at least one of said rolls being continuously rotated from the winding mechanism of the machine, means for normally maintaining said rolls apart to prevent the feeding of the strip, and means controlled from the winding mechanism to cause the rolls to bear against the opposite sides of the strip to feed the latter during a predetermined period whereby the strip is inserted in the coil beneath the windings of conductor.

3. In a coil-winding machine, the combination with the winding-mandrel and means for guiding the conductor onto the mandrel, of means for feeding strips of insulating-material into the coil at intervals of the winding comprising a pair of feed-rolls adapted to bear against the opposite sides of the strip, one of said rolls being continuously rotated during the operation of the machine, means for maintaining one of said rolls away from the strip during the intervals between the feeding action, means to carry said movable roll toward the strip to press the latter against the opposite roll to cause the strip to be fed thereby, and means for automatically operating said movable roll from the winding mechanism.

4. In a coil-winding machine, the combination with the winding-spindle and means for guiding the conductor to wind it in layers on the spindle, of a pair of opposed feed-rolls for feeding sheet-insulation into the coil, means for continuously rotating one of the rolls, means for normally maintaining the opposite roll removed from contact with the sheet-material, and automatic means operated from the winding mechanism to periodically cause the rolls to bear against the sheet-material passing between them whereby to feed the sheet to the coil at intervals of the winding.

5. In a coil-winding machine, the combination with the winding-mandrel and means for guiding the conductor onto the mandrel, of a pair of feed-rolls adapted to contact with a strip of sheet-material to feed the latter into the coil, one of said rolls being continuously rotated, means for normally maintaining said feed-rolls apart in inactive relation with respect to the strip, and means operated from the winding mechanism to periodically close the rolls together to cause them to feed the strip into the coil at intervals of the winding.

6. In a coil-winding machine, the combination with the winding-mandrel and means for guiding the conductor onto the mandrel, of a pair of feed-rolls for feeding strips of sheet-insulation into the coil, means for continuously rotating one of the rolls, means for normally maintaining the rolls apart to prevent their feeding action, means for causing the rolls to bear against the strip passing between them to feed said strip, and means for severing the strip after the feeding movement whereby a predetermined length of the strip is inserted into the coil.

7. In a coil-winding machine, the combination with the winding-mandrel and means for guiding the conductor onto the mandrel, of a continuously driven feed-roll rotatable about a fixed axis, a second feed-roll arranged opposite the rotating feed-roll and adapted to be moved toward and away therefrom, means for normally maintaining said rolls in spaced relation, means for carrying the second roll toward the first roll to cause said rolls to bear against a strip of sheet-material to be fed therebetween, and means operated from the winding mechanism to regulate the duration of contact of the rolls on the strip whereby to feed a predetermined length of the strip into the coil.

8. In a coil-winding machine, the combination with the winding-mandrel and means for guiding the conductor onto the mandrel, of a guiding-chute for directing a strip of insulating-material toward the coil being wound on the mandrel, a pair of feed-rolls adapted to be pressed against the strip as it passes therebetween, one of said rolls being continuously rotated during the operation of the machine, means for normally maintaining said rolls out of feeding contact with the strip, means operated from the winding mechanism to periodically effect the contact of the rolls with the strip, and means for severing the strip after a predetermined length thereof has been fed to the coil.

9. In a coil-winding machine, the combination with the winding-mandrel and means for guiding the conductor onto the mandrel, of means for inserting sheet-material into the coil, a plurality of presser-rollers maintained in contact with the periphery of the coil throughout the winding and adapted to bear against the sheet at a plurality of points along its length as it feeds to the coil to cause it to lay flat against the windings, means for periodically feeding the strip to the coil and under the presser-rollers, and means to sever the strip after each feeding action to regulate the length of strip inserted into the coil.

10. In a coil-winding machine, the combination with the winding-mandrel and means for guiding the conductor onto the mandrel, of means for feeding sheets of insulating-material into the coil at intervals of the winding, a plurality of presser-rollers adapted to bear at spaced apart points on the periphery of the coil throughout the winding, and means to maintain said presser-rollers constantly in contact with the periphery of the coil during the increase in diameter of the winding to cause them to press the insulating sheets into place thereon.

11. In a coil-winding machine, the combination with the winding-mandrel and means for guiding the conductor onto the mandrel, of means for feeding sheet-insulation into the coil at intervals of the winding, a pair of spaced-apart presser-rollers adapted to bear against the coil throughout the winding and to press the sheet-insulation against the coil as it feeds thereto, and means for connecting said rollers to be rotated in unison from the coil.

12. In a coil-winding machine, the combination with the winding-mandrel and means for guiding the conductor onto the mandrel, of feed-rolls for feeding a strip of sheet-metal to the coil at intervals of the winding, at least one of said rolls being continuously rotated during the operation of the machine, means for moving said feed-rolls toward and away from each other to cause them to act periodically to feed the strip, and a cam operated from the winding mechanism and adapted to maintain the rolls normally separated and to effect their contact with the strip for a predetermined period when said strip is to be fed into the coil.

13. In a coil-winding machine, the combination with the winding-mandrel and means for traversing the conductor with respect to the mandrel, of a pair of feed-rolls for feeding a strip of sheet-material to the coil at intervals of the winding, one of said rolls being movable with respect to the other and at least one of said rolls being continuously rotated, a cam operated from the traversing-means to normally maintain the movable roll removed from contact with the strip passing between the rolls and adapted to release said roll to allow it to contact with the strip at a predetermined point in the traverse of the conductor, and automatically-operated means for severing the strip as it feeds to the coil.

14. In a coil-winding machine, the combination with the winding-mandrel and means for traversing the conductor with respect to the mandrel, of a pair of feed-rolls for feeding sheet-material into the coil, one of said rolls being continuously rotated during the operation of the machine, a movable element on which one of the rolls is mounted to adapt it to be carried toward and away from the other roll, a cam driven from the winding mechanism, and a follower on the movable element engaging the cam to normally maintain the rolls separated and to effect contact of the rolls with the sheet-material at predetermined intervals of the winding.

15. In a coil-winding machine, the combination with the winding-mandrel and means for traversing the conductor longitudinally with respect thereto, of a continuously driven feed-roll operated from the winding mechanism, a second idler feed-roll adapted to bear against a strip of material passing between the rolls, a lever for mounting the second roll to adapt it to be moved toward and away from the first roll, a cam driven from the winding mechanism and provided with a notch in its periphery, a follower on the roll-carrying lever adapted to ride on the cam to hold the second roll away from the first roll and adapted to drop into the notch to allow the second roll to move toward the first roll to cause the rolls to feed the strip, and means for controlling the lever to cause the follower to ride on the cam.

16. In a coil-winding machine, the combination with the winding-mandrel and means for traversing the conductor with respect to the mandrel, of a continuously driven feed-roll operated from the winding mechanism, a second feed-roll adapted to bear against a strip of material passing between the rolls, a lever for mounting the second roll to adapt it to be moved toward and away from the first roll, a circular cam rotated from the winding mechanism and provided with a notch in its periphery, a follower on the roll-carrying lever adapted to ride on the cam to hold the second roll away from the first roll and adapted to drop into the notch to allow the second roll to move toward the first roll to cause the rolls to feed the strip, and means adjustable on the lever to adapt it to be engaged by the notch in the cam to swing the lever to withdraw the second roll from the first roll after the strip has been fed to a predetermined extent.

17. In a machine for winding electrical coils, the combination with the winding mechanism, of means for inserting sheets of insulating-material into the coil at intervals of the winding comprising a feed-roll, a movable element for carrying said feed-roll into contact with the sheet to effect the feed of the latter, a follower on said element, a cam engaged by said follower to normally maintain the feed-roll out of contact with the sheet and formed with a notch to effect the contact of the roll with the sheet, a second follower adapted to engage the end of the notch in the cam to release the feed-roll from contact with the sheet, and means to adjust said second follower to regulate the timing of the release of the feed-roll from the sheet.

18. In a machine for winding electrical coils, the combination with the winding mechanism, of means for feeding sheet-material into the coil at intervals of the winding comprising a feed-roll adapted to contact with the sheet to feed the latter, a cam operated from the winding mechanism to normally maintain the feed-roll out of contact with the sheet and to allow it to press upon the sheet to feed the latter during a predetermined period, a second cam operated synchronously with the first cam, and means operated from the second cam to sever the sheet after it has been fed to a predetermined extent.

19. In a machine for winding electrical coils, the combination with the winding mechanism, of means for feeding sheet-material into the coil at intervals of the winding comprising a continuously rotated feed-roll adapted to feed the sheet, a second idler feed-roll movably mounted with respect to the first roll, cutting-off means for severing the sheet after it has been fed to a predetermined extent, a continuously rotated shaft connected to be driven from the winding mechanism, a cam rotated from said shaft to operate the idler feed-roll to carry it toward the rotating roll, and a second cam also driven from said shaft to operate the cutting-off means with a predetermined timing with relation to the operation of the feeding-means.

20. In a machine for winding electrical coils, the combination with the winding mechanism, of means for feeding sheet-material into the coil at intervals of the winding, and means for severing the sheet after the feeding-action comprising a fixed knife, a movable knife adapted to cooperate with the fixed knife, resilient means for operating the movable knife, and a cam for carrying the movable knife away from the fixed knife and for then causing it to be moved into juxtaposition therewith to sever the strip.

21. In a machine for winding electrical coils, the combination with the winding mechanism, of means for feeding strips of insulating material to the coil, and means for severing the strip after it has been fed to a predetermined extent comprising a fixed knife, a member movable with respect to the fixed knife, and a second knife having a rockable bearing on said movable member and provided with extensions adapted to bear across the cutting edge of the fixed knife whereby to maintain the knives in alinement during the severing action.

22. In a machine for winding electrical coils, the combination with the winding mechanism, of means for feeding strips of insulating-material to the coil, and means for severing the strip after it has been fed to a predetermined extent comprising a fixed knife, a member movable with respect to the fixed knife, a second knife having a rockable bearing on said movable member and having extensions at its ends adapted to bear across the edge of the fixed knife whereby to maintain the knives in alinement during the cutting action, and resilient means for holding the rockable knife in position on the movable member.

23. In a machine for winding electrical coils, the combination with the winding mechanism, of means for feeding a strip of insulating material into the coil and severing the strip at intervals of the feed comprising a fixed knife, a movable member, a second knife having a ball-and-socket bearing on the movable member to adapt said knife to rock slightly on a lateral axis, said second knife formed with projections extending forwardly of its cutting edge and resting across the fixed knife to maintain the cutting edges of the knives in alined relation, and a clamp for holding the second knife in place on the movable member while allowing it to be removed for sharpening.

24. In a winding machine, the combination with a winding mandrel, of means to traverse strand-material on the mandrel comprising a strand-guide, reciprocating means for traversing the strand-guide, and resilient means acting against the strand-guide, to normally hold it in fixed position on the traversing-means while allowing it to yield laterally when the guide encounters undue resistance to its reciprocating movement.

25. In a winding machine, the combination with a winding-spindle, of a traverse-rod adapted to be reciprocated longitudinally of the spindle, a strand-guide mounted on said traverse-rod, and resilient means for normally maintaining the strand-guide in fixed relation on the traverse-rod while allowing it to be shifted longitudinally thereof when the guide encounters undue resistance to its traverse with the rod.

26. In a winding machine, the combination with a winding-spindle, of a traverse-rod adapted to be reciprocated longitudinally with respect to the spindle, a guide-arm having hubs mounted on the traverse-rod, collars fastened to the traverse-rod at one side of each of the hubs of the guide-arm, and a spring bearing between one of the hubs and one of the collars to normally hold the guide-arm against the collars to regulate its position on the traverse-rod while allowing it to be shifted longitudinally thereof when the guide encounters undue resistance to its traversing motion.

27. In a winding machine, the combination with a frame having bearings for the winding-spindle and its driving-means, of an auxiliary frame-extension having a bearing for a supplemental winding spindle, and gearing in the frame for connecting said supplemental spindle to be driven from the driving-means of the main spindle.

28. In a coil-winding machine, the combination with the winding mechanism, of means for feeding sheet-material to the coil comprising a guide-chute, a movable extension at the end of the chute adapted to direct the sheet tangentially with respect to the periphery of the coil, and means to adjust said extension with respect to the axis of the coil as the latter increases in diameter.

29. In a coil-winding machine, the combination with the winding mechanism, of guiding-means for directing strips of sheet-material to the coil during the winding comprising a fixed chute for the strip, and an extension-chute hinged to the fixed chute and adapted to be moved with respect to the axis of the coil as the latter increases in diameter.

30. In a coil-winding machine, the combination with the winding mechanism, of guiding-means for directing strips of sheet-material to the coil during the winding thereof comprising a chute for the strip, and edge-guides adjustable on said chute in accordance with the width of the strip to adapt them to abut the edges thereof.

31. In a coil-winding machine, the combination with the winding mechanism, of guiding-means for feeding strips of sheet-material into the coil during the winding comprising a chute having a back-plate formed with lateral slots, guide-members adapted to abut the edges of the strip as it feeds across the plate and formed with projections inserted through the slots in said plate to adapt the guides to be adjusted laterally in relation to each other, and spring-elements engaging said projections and bearing frictionally against the back of the plate to hold the guides in their adjusted position.

32. Strip-guiding means for winding machines comprising a chute having a fixed back-plate across which the strip draws and provided with lateral slots, guide-elements adapted to abut the edges of the strip and formed with projections inserted through the slots in the plate to adapt said guides to be adjusted laterally thereof, and wire spring-elements inserted through the projections on the guides and bent to frictionally engage the back of the plate to hold the guides in adjusted position thereon.

33. In a strip-guiding means for winding machines, the combination with a chute comprising a plate, guiding-means on said plate adapted to abut the edges of the strip as it feeds thereacross, and spring pressure-means adapted to bear on the strip to press the latter against the plate to provide resistance to the movement of the strip and to hold it from dropping out of the chute.

34. In a strip-guiding device for winding machines, the combination with a chute comprising a plate across which the strip draws, means abutting the edges of the strip to guide it on the plate, and a strip-retaining device comprising a strip of sheet-metal held at its ends against the plate and bowed inwardly to bear against the strip to press the latter against the plate to retain the strip in position in the chute.

35. In a strip-guiding device, the combination with a chute through which the strip feeds, of headed studs projecting from said chute, and a retainer for holding the strip against the chute comprising a length of spring-metal formed with a slot at one end engaging one of the studs and a button-hole at the opposite end engaging the other stud, said spring-retainer being bowed inwardly to adapt it to bear against the strip to press the latter against the chute and adapted to be sprung outwardly to allow the head of the stud to pass through the enlarged end of the buttonhole whereby said retainer may be swung out of position to facilitate placing the strip in the chute.

36. In a strip-guiding device for winding machines, the combination with a chute comprising a back-plate, guiding members formed of folded lengths of sheet-metal adapted to overlie the edges of the strip to direct it through the chute, means for adjusting said guiding-members laterally in relation to each other in accordance with the width of the strip feeding through the chute, and means to secure said guiding-elements in their adjusted position.

37. In a strip-guiding device for winding machines, the combination with a fixed chute through which the strip feeds, and a chute-extension comprising overlying plates hinged to the end of the fixed chute to swing in angular relation thereto, and means on said chute-extension for limiting its swinging movement in relation to the fixed chute.

In testimony whereof I affix my signature.

CHARLES D. REYNOLDS.